(12) United States Patent
Tani

(10) Patent No.: US 8,798,668 B2
(45) Date of Patent: Aug. 5, 2014

(54) CALL CONTROL SYSTEM AND CALL CONTROL METHOD

(75) Inventor: Yasuhiro Tani, Tokyo (JP)

(73) Assignee: NEC Corporation, Tokyo (JP)

( * ) Notice: Subject to any disclaimer, the term of this patent is extended or adjusted under 35 U.S.C. 154(b) by 301 days.

(21) Appl. No.: 13/376,706

(22) PCT Filed: May 27, 2010

(86) PCT No.: PCT/JP2010/003577
§ 371 (c)(1),
(2), (4) Date: Dec. 7, 2011

(87) PCT Pub. No.: WO2010/143368
PCT Pub. Date: Dec. 16, 2010

(65) Prior Publication Data
US 2012/0088504 A1 Apr. 12, 2012

(30) Foreign Application Priority Data
Jun. 11, 2009 (JP) ................................ 2009-140071

(51) Int. Cl.
*H04W 4/00* (2009.01)
*H04M 11/04* (2006.01)
*H04B 7/00* (2006.01)

(52) U.S. Cl.
USPC ........ 455/525; 455/404.1; 455/521; 455/434; 370/254; 370/252

(58) Field of Classification Search
CPC ................................ H04W 28/20; H04W 4/22
USPC .............. 455/434, 404.1, 525, 521; 370/254, 370/252; 709/224
See application file for complete search history.

(56) References Cited

U.S. PATENT DOCUMENTS 7,286,654 B1 * 10/2007 Ahn et al. ................ 379/112.04
2007/0201380 A1 * 8/2007 Ma et al. ........................ 370/254
(Continued)

FOREIGN PATENT DOCUMENTS

| JP | 2000-175244 | 6/2000 |
| JP | 2003-209871 | 7/2003 |
| JP | 2003-259436 | 9/2003 |
| JP | 2008-11180 | 1/2008 |

OTHER PUBLICATIONS

Examiner's Comments mailed Jan. 29, 2013 by the Japanese Patent Office in Japanese Patent Application No. 2011-518242, partial translation, 3 pages.

(Continued)

*Primary Examiner* — Opiribo Georgewill
(74) *Attorney, Agent, or Firm* — Young & Thompson

(57) ABSTRACT

A call control system performs call control for a terminal which accesses different radio access network systems. A communication exchange processing apparatus includes: a device storing maximum bandwidth for specified calls processed in the radio access network system; a device measuring present bandwidth for specified calls presently processed in the radio access network system; a device computing a ratio of the present bandwidth to the maximum bandwidth for specified calls; and a device sending specified call band ratio information indicating the ratio of present bandwidth to maximum bandwidth for specified calls to a radio network control apparatus in the radio access network system and connected to the present communication exchange processing apparatus. The radio network control apparatus provided in the radio access network system includes a device sending the specified call band ratio information to a terminal which is connected to the present radio network control apparatus by radio communication.

5 Claims, 4 Drawing Sheets

(56) References Cited

U.S. PATENT DOCUMENTS

2008/0045204 A1   2/2008  Takano et al.
2010/0184460 A1*  7/2010  Maguire .................... 455/552.1
2011/0007633 A1   1/2011  Takano et al.
2011/0053597 A1*  3/2011  Lee et al. ..................... 455/436
2011/0098075 A1*  4/2011  Bienas et al. ................. 455/517

OTHER PUBLICATIONS

International Search Report, PCT/JP2010/003577, dated Aug. 24, 2010, with English Translation.

* cited by examiner

CALL CONTROL SYSTEM AND CALL CONTROL METHOD

TECHNICAL FIELD

The present invention relates to a call control system and a call control method, which perform a control for transferring a specified call to an external radio communication system.

Priority is claimed on Japanese Patent Application No. 2009-140071, filed Jun. 11, 2009, the contents of which are incorporated herein by reference.

BACKGROUND ART

A standardization group called "3GPP" standardizes a third (or after) generation technique for mobile communication systems, and currently-examined systems are called "UTRAN" (universal terrestrial radio access network) or "E-UTRAN" (evolved universal terrestrial radio access network) which functions as a specification for a radio access network system.

In each system of UTRAN and E-UTRAN, it has been examined that connection of an emergency call (sent to a police or fire station) is given priority in comparison with other ordinary calls. Patent Document 1 discloses a technique for controlling an emergency call.

PRIOR ART DOCUMENT

Patent Document

Patent Document 1: Japanese Unexamined Patent Application, First Publication No. 2003-209871.

DISCLOSURE OF INVENTION

Problem to be Solved by the Invention

However, in a mobile communication system as described above, an ordinary call during conversation may be disconnected so as to connect an emergency call (when there is no empty resource, a resource for connecting an emergency call is secured by disconnecting an ordinary call).

Therefore, even in a mobile communication system which employs UTRAN or E-UTRAN, when an emergency call is successfully connected, an ordinary call during conversation may be disconnected instead.

In addition, if emergency calls are concentratedly issued due to a trouble case, accident, disaster, or the like, requests for connecting the emergency calls are concentrated but each connection may be unsuccessful due to insufficient resources.

In light of the above circumstances, an object of the present invention is to provide a call control system and a call control method, which can improve reliability for connecting a specified call such as an emergency call in communication between a terminal and a radio access network system.

Means for Solving the Problem

In order to achieve the above object, the present invention provides a call control system that performs call control for a terminal which accesses different radio access network systems, wherein:

(i) a communication exchange processing apparatus includes:
a specified call maximum bandwidth storage device that stores a maximum bandwidth for specified calls processed in a radio access network system to which the present apparatus belongs;
a specified call bandwidth measuring device that measures a present bandwidth for specified calls presently processed in the radio access network system to which the present apparatus belongs;
a band ratio computation device that computes a ratio of the present bandwidth to the maximum bandwidth for specified calls; and
a band ratio notification device that sends specified call band ratio information which indicates the ratio of the present bandwidth to the maximum bandwidth for specified calls to a radio network control apparatus which is provided in the radio access network system and is connected to the present communication exchange processing apparatus; and
(ii) the radio network control apparatus provided in the radio access network system includes a specified call band ratio information sending device that sends the specified call band ratio information to a terminal which is connected to the present radio network control apparatus by radio communication.

In a preferable example of the above-described call control system, the terminal includes:
a specified call band ratio information receiving device that receives the specified call band ratio information from each of the different radio access network systems; and
a call connection processing device that issues a specified call connected to the radio access network system which sent the specified call band ratio information that indicates the minimum ratio.

For the above-described call control system, typically, the different radio access network systems are two radio access network system which are UTRAN and E-UTRAN.

In a typical example, the specified calls are emergency notification calls.

In a typical example, the communication exchange processing apparatus is:
a mobile service switching center abbreviated as MSC when the radio access network system is UTRAN; or
an enhanced power control abbreviated as EPC when the radio access network system is E-UTRAN.

In a typical example, the radio network control apparatus is:
one of a NodeB and a radio network controller abbreviated as RNC when the radio access network system is UTRAN; or
an eNodeB when the radio access network system is E-UTRAN.

The present invention also provides a call control method used in a call control system that performs call control for a terminal which accesses different radio access network systems, wherein:
a specified call maximum bandwidth storage device of a communication exchange processing apparatus stores a maximum bandwidth for specified calls processed in a radio access network system to which the present apparatus belongs;
a specified call bandwidth measuring device of the communication exchange processing apparatus measures a present bandwidth for specified calls presently processed in the radio access network system to which the present apparatus belongs;
a band ratio computation device of the communication exchange processing apparatus computes a ratio of the present bandwidth to the maximum bandwidth for specified calls;
a band ratio notification device of the communication exchange processing apparatus sends specified call band ratio information which indicates the ratio of the present bandwidth to the maximum bandwidth for specified calls to a radio network control apparatus which is provided in the radio access network system and is connected to the present communication exchange processing apparatus; and a specified call band ratio information sending device of the radio network control apparatus provided in the radio access network system sends the specified call band ratio information to a terminal which is connected to the present radio network control apparatus by radio communication.

Effect of the Invention

In accordance with the present invention, even when the bandwidth for ordinary calls is extremely expanding in a radio access network system, an emergency call can be issued using another radio access network system, so that no ordinary call during conversation in the radio access network system (having a large usage band for ordinary calls) is disconnected, and emergency call issuance can be reliably performed.

MODE FOR CARRYING OUT THE INVENTION

Below, a call control system as an embodiment of the present invention will be explained with reference to the drawings.

Figure 1:
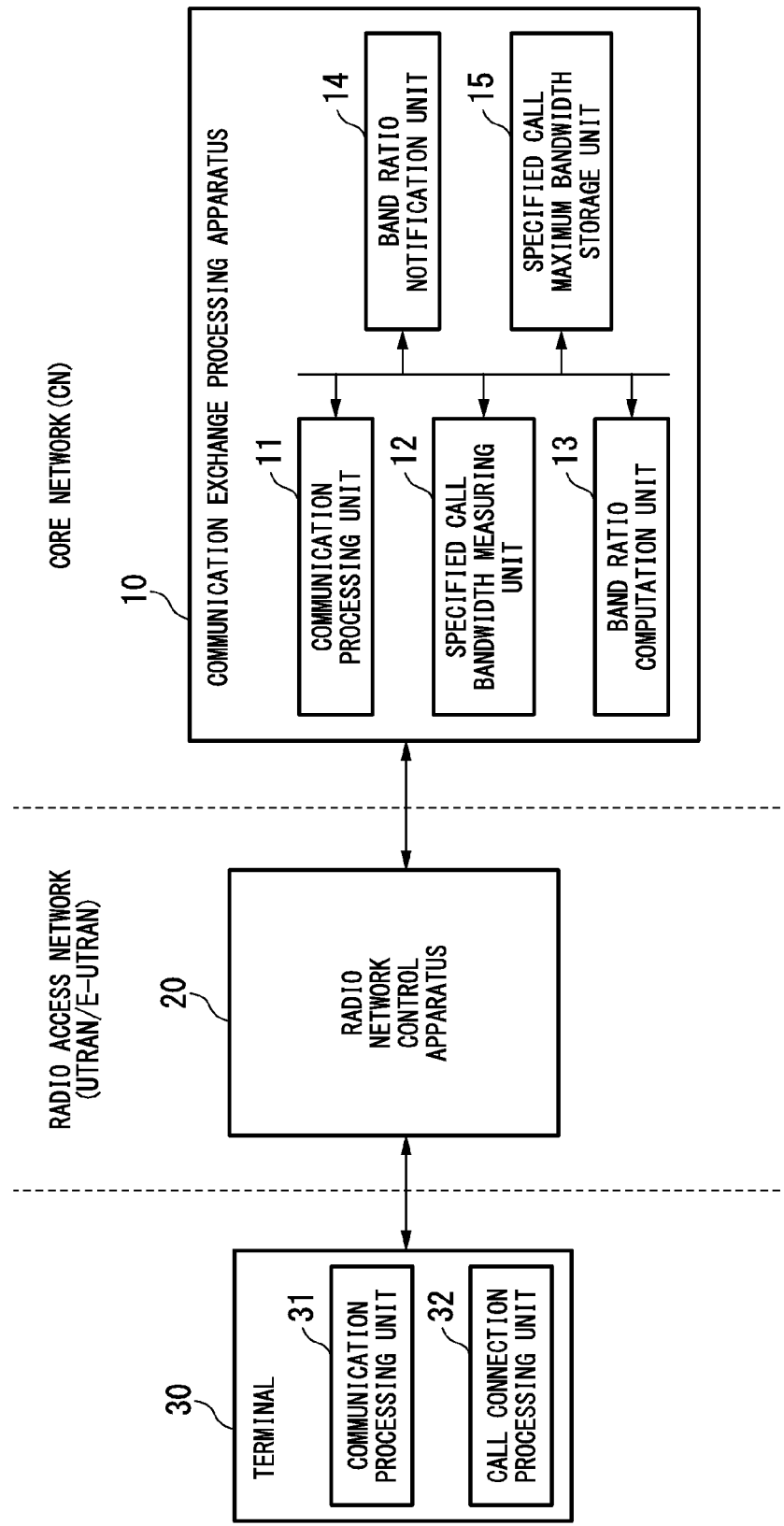
FIG. 1 is a block diagram showing functions of each apparatus included in the call control system as an embodiment of the present invention.

FIG. 1 is a block diagram showing functions of each apparatus included in the call control system of the embodiment.

In FIG. 1, reference numeral 10 indicates a communication exchange processing apparatus; reference numeral 20 indicates a radio network control apparatus (based on a radio access network UTRAN or E-UTRAN); and reference numeral 30 indicates a terminal.

The communication exchange processing apparatus 10 performs an exchange process (for packet exchange or line exchange operation) with respect to reception from the radio network control apparatus 20 which functions as a base station apparatus.

When the communication exchange processing apparatus 10 belongs to an UTRAN (radio access network system) via the radio network control apparatus 20, the communication exchange processing apparatus 10 is an apparatus called MSC (mobile service switching center). When the communication exchange processing apparatus 10 belongs to an E-UTRAN (radio access network system) via the radio network control apparatus 20, the communication exchange processing apparatus 10 is an apparatus called EPC (enhanced power control).

Additionally, when the radio network control apparatus 20 belongs to the UTRAN, it is an apparatus called NodeB or RNC (radio network controller). When the radio network control apparatus 20 belongs to the E-UTRAN, it is an apparatus called eNodeB.

The terminal 30 is a user terminal such as a cellular phone.

In FIG. 1, one communication exchange processing apparatus 10, one radio network control apparatus 20, and one terminal 30 are shown. However, in the present call control system, the communication exchange processing apparatus 10 and the radio network control apparatus 20 are provided for each of the individual radio access network systems.

That is, the communication exchange processing apparatus 10 (MSC) and the radio network control apparatus 20 (NodeB or RNC) used for UTRAN (radio access network system) are separately provided from the communication exchange processing apparatus 10 (EPC) and the radio network control apparatus 20 (eNodeB) used for E-UTRAN (radio access network system) so as to form different systems.

When using the system for UTRAN, the terminal 30 accesses the radio network control apparatus 20 (NodeB or RNC) employed in the radio access network system UTRAN. When using the system for E-UTRAN, the terminal 30 accesses the radio network control apparatus 20 (eNodeB) employed in the radio access network system E-UTRAN.

Figure 2:
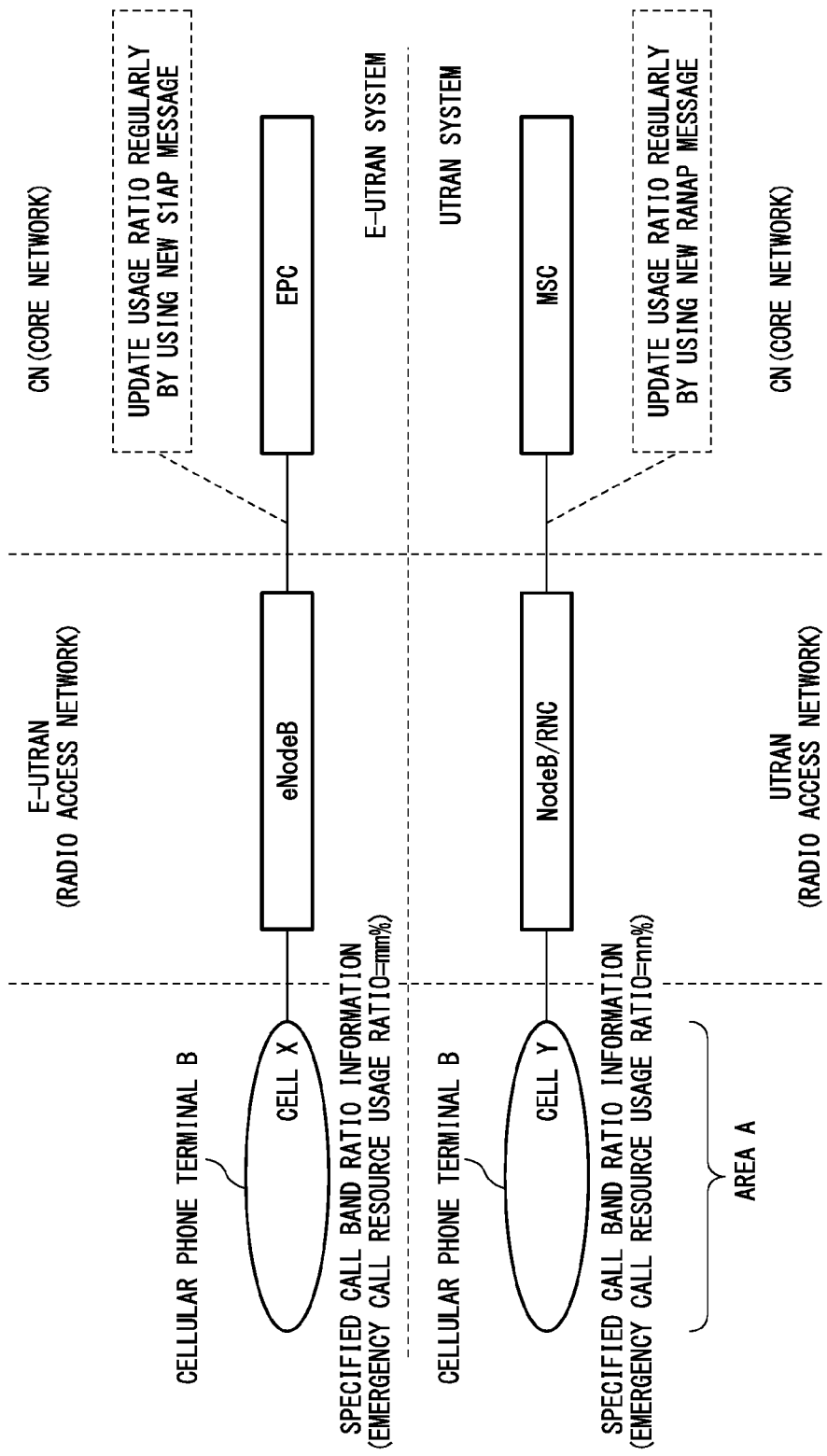
FIG. 2 is a first diagram for showing the general operation of the call control system.

FIG. 2 is a first diagram for showing the general operation of the call control system in the present embodiment.

As shown in FIG. 2, the present call control system corresponds to a radio access network system UTRAN and a radio access network system E-UTRAN.

Although the present embodiment corresponds to two different radio access network systems, a call control system corresponding to three or more different radio access network systems is possible.

FIG. 2 shows a configuration in which the terminal 30 (cellular phone terminal) can access one of the following from the same position:

(i) a radio access network system UTRAN having NodeB or RNC as the radio network control apparatus 20 which belongs to an radio access network, and MSC as the communication exchange processing apparatus 10 which belongs to a core network; and (ii) a radio access network system E-UTRAN having eNodeB as the radio network control apparatus 20 which belongs to an radio access network, and EPC as the communication exchange processing apparatus 10 which belongs to a core network.

That is, the two different radio access network systems UTRAN and E-UTRAN each have a possible communication region (cell) which covers a common area.

The call control system of the present embodiment performs call control of each terminal which accesses multiple different radio access network systems.

The communication exchange processing apparatus 10 (i) stores the maximum bandwidth for each specific call processed in the radio access network system to which the communication exchange processing apparatus 10 belongs via the radio network control apparatus 20, and (ii) measures the current bandwidth for each specified call which is currently processed.

The communication exchange processing apparatus 10 also computes a (usage) ratio of the current bandwidth for the specified call to the above maximum bandwidth, and communicates specified call band ratio information, which indicates the computed ratio, to the radio network control apparatus 20 in the radio access network system connected to the present communication exchange processing apparatus 10.

The radio network control apparatus 20 sends the specified call band ratio information to the terminal 30 connected to the present radio network control apparatus 20 by radio communication.

The radio network controller 30 receives the specified call band ratio information from each of the different radio access network systems, and issues a specified call connected to the radio access network system which sent the specified call band ratio information that indicates the lowest ratio.

Accordingly, the call control system of the present embodiment performs an operation that improves reliability for connection of specified calls such as an emergency call in communication between a terminal and a radio access network system.

Figure 3:
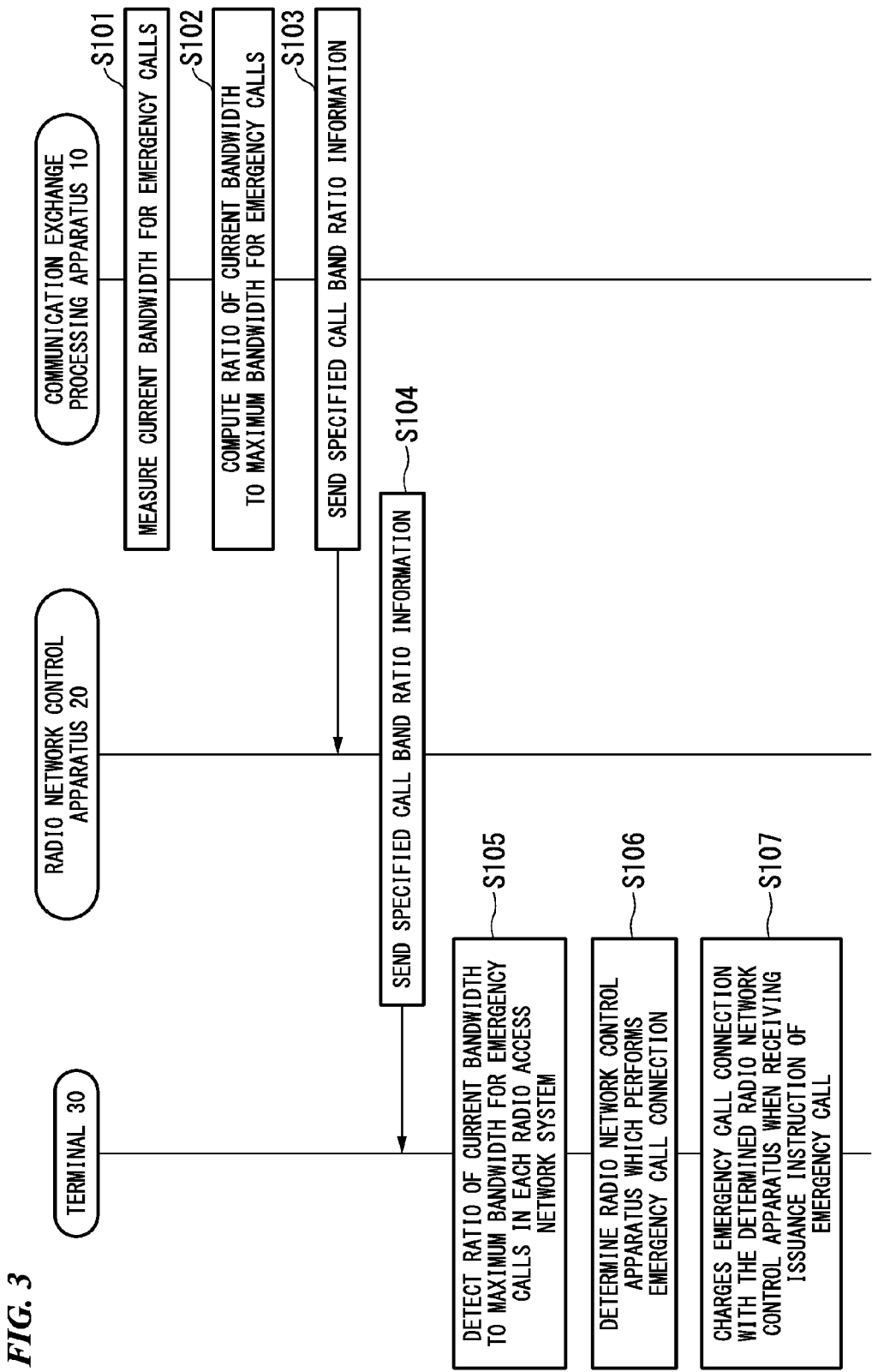
FIG. 3 is a diagram showing an operation flow of the call control system.

FIG. 3 is a diagram showing an operation flow of the call control system.

Below, the operation flow of the call control system will be explained using FIG. 3.

First, EPC or MSC as the communication exchange processing apparatus 10 stores the maximum bandwidth, which can be used for specified call communication in the radio access network system to which the present communication exchange processing apparatus 10 belongs, in the specified call maximum bandwidth storage unit 15 in advance. In the present embodiment, the maximum bandwidth for emergency calls used for accessing a police or fire station is stored.

The specified call bandwidth measuring unit 12 in EPC or MSC measures the current bandwidth for emergency calls to be processed by the present apparatus (see step S101).

Next, the band ratio computation unit 13 in the communication exchange processing apparatus 10 retrieves the maximum bandwidth for emergency calls, which is stored in the specified call maximum bandwidth storage unit 15, and computes "current bandwidth/maximum bandwidth" for emergency calls so as to obtain a ratio of the current bandwidth to the maximum bandwidth for emergency calls (see step S102).

The band ratio notification unit 14 in the communication exchange processing apparatus 10 then generates specified call band ratio information which indicates the ratio of the current bandwidth to the maximum bandwidth for emergency calls, and sends the information to the radio network control apparatus 20 connected to the present communication exchange processing apparatus 10 (see step S103). Specifically, the specified call band ratio information is an RANAP message communicated between MSC and RNC in UTRAN, or an S1AP message communicated between EPC and eNodeB in E-UTRAN.

The communication exchange processing apparatus 10 performs the operation from step S101 to step S103 at predetermined regular intervals.

Next, the radio network control apparatus 20, which receives the specified call band ratio information, sends the specified call band ratio information to the terminal 30 present in the possible communication region (cell) of the present apparatus (see step S104).

Accordingly, the communication processing unit 31 of the terminal 30 receives the specified call band ratio information from both the radio access network system of UTRAN and the radio access network system of the E-UTRAN.

Next, the call connection processing unit 32 of the terminal 30 detects the ratio of the current bandwidth to the maximum bandwidth for emergency calls from each of the received specified call band ratio information items (two information items in the present embodiment) (see step S105).

The call connection processing unit 32 detects one of the received specified call band ratio information items which indicates the lowest ratio, and determines the radio network control apparatus 20 of the radio access network system, which sent the detected information, to be the apparatus which will execute the connection of each emergency call (see step S106). After that, when receiving an issuance instruction of an emergency call, the call connection processing unit 32 charges the emergency call connection with the determined radio network control apparatus 20 (see step S107).

Additionally, every time the call connection processing unit 32 of the terminal 30 receives the specified call band ratio information from each radio access network system, the call connection processing unit 32 extracts the ratio of the current bandwidth to the maximum bandwidth for emergency calls, which is included in the relevant information, and sets or registers in a memory or the like, information that indicates the radio access network system (between two) with which the emergency call connection should be charged.

Figure 4:
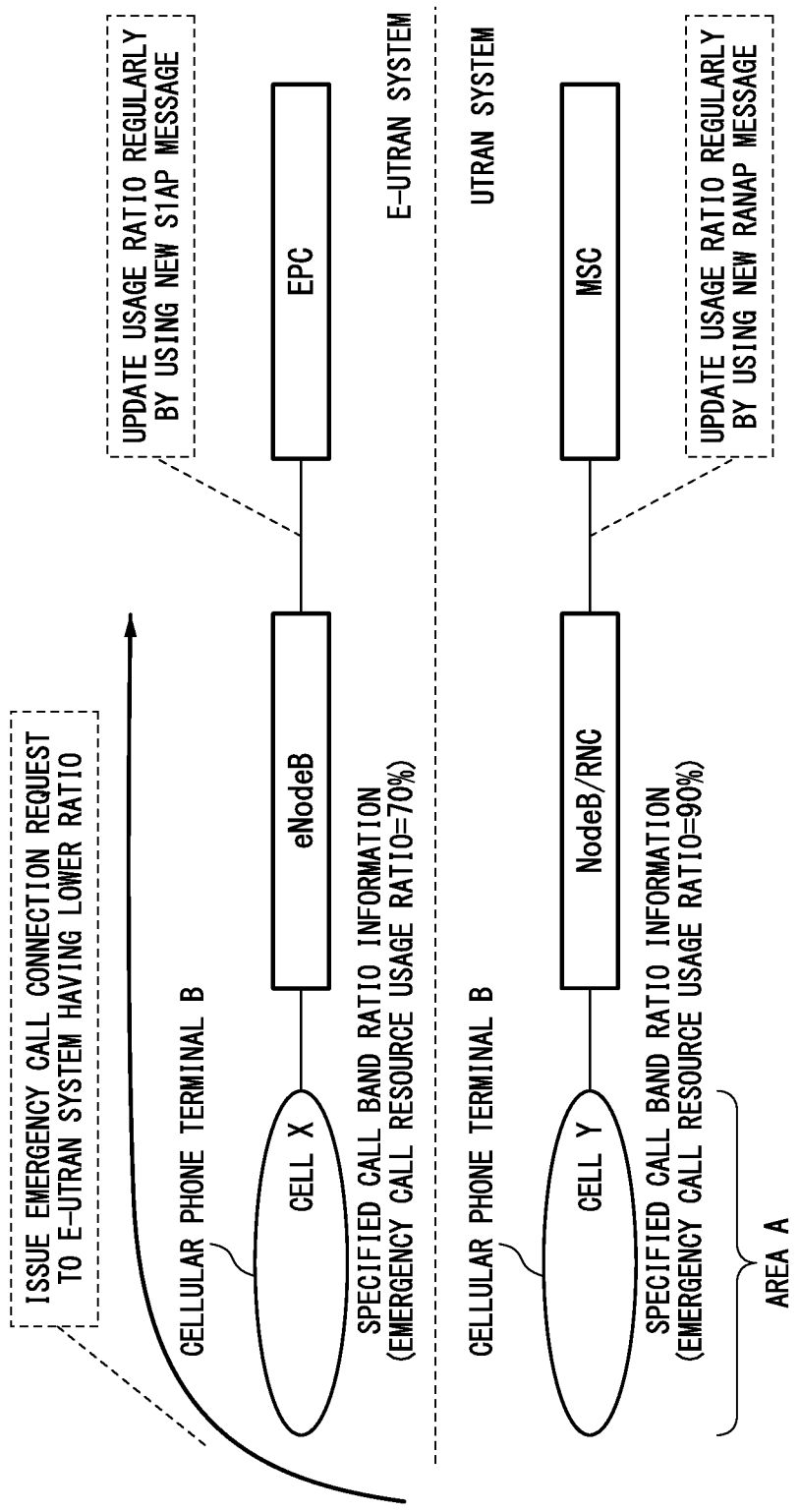
FIG. 4 is a second diagram for showing the general operation of the call control system.

FIG. 4 is a second diagram for showing the general operation of the call control system in the present embodiment.

According to the above-described operation, if (see FIG. 4) the emergency call usage ratio of the UTRAN system is 90%, and that of the E-UTRAN system is 70%, then when a user having a cellular phone B (corresponding to the terminal 30) instructs an emergency call issuance, the terminal 30 examines the usage ratio of each radio access network system, and issues an emergency call connection request to the E-UTRAN system which has a lower ratio.

Accordingly, even when the bandwidth for ordinary calls is extremely expanding in a radio access network system, an emergency call can be issued using another radio access network system, so that no ordinary call during conversation in the radio access network system (having a large usage band for ordinary calls) is disconnected, and emergency call issuance can be reliably performed.

Here, not only the usage ratio of the dedicated resources for emergency calls but also usage ratio for ordinary calls in the entire system may be notified. In such a case, load dispersion between multiple systems can be implemented not only for emergency calls but also for ordinary calls, thereby obtaining a high success ratio for call connection.

When the usage ratio for the entire system is employed, the system performance may be degraded if each change in the usage ratio is notified. This is because such a notification manner increases the number of RANAP or S1AP messages and the number of updated notification information items. Therefore, it is preferable to employ a notification manner such that notification is only executed only when the relevant ratio exceeds a predetermined threshold (e.g., 80%).

The above-described apparatuses each include a computer system. The steps of the operation of each apparatus are stored as a program in a computer-readable storage medium, and the operation is performed when the relevant computer loads and executes the program.

The above computer readable storage medium is a magnetic disk, magneto optical disk, CD-ROM, DVD-ROM, semiconductor memory, or the like.

In addition, the relevant computer program may be provided to a computer via a communication line, and the computer which received the program may execute the program.

In addition, the program may execute a part of the above-explained functions, or may be a program (so-called "differential program") by which the above-described functions can be executed by a combination of this program and an existing program which has already been stored in the relevant computer system.

INDUSTRIAL APPLICABILITY

In accordance with the present invention, even when the bandwidth for ordinary calls is extremely expanding in a radio access network system, an emergency call can be issued using another radio access network system, so that no ordinary call during conversation in the radio access network system (having a large usage band for ordinary calls) is disconnected, and emergency call issuance can be reliably performed.

REFERENCE SYMBOLS 10 communication exchange processing apparatus
11 communication processing unit
12 specified call bandwidth measuring unit
13 band ratio computation unit
14 band ratio notification unit
15 specified call maximum bandwidth storage unit
20 radio network control apparatus
30 terminal
31 communication processing unit
32 call connection processing unit

The invention claimed is:

1. A call control system that performs call control for a terminal which accesses different radio access network systems, comprising:
a communication exchange processing apparatus that includes:
an emergency notification call maximum bandwidth storage device that stores a maximum bandwidth for emergency notification calls processed in a radio access network system to which the processing apparatus belongs;
an emergency notification call bandwidth measuring device that measures a present bandwidth for emergency notification calls presently processed in the radio access network system to which the processing apparatus belongs;
a band ratio computation device that computes a ratio of the present bandwidth to the maximum bandwidth for emergency notification calls; and
a band ratio notification device that sends emergency notification call band ratio information which indicates the ratio of the present bandwidth to the maximum bandwidth for emergency notification calls to a radio network control apparatus which is provided in the radio access network system and is connected to the processing apparatus;
wherein the radio network control apparatus provided in the radio access network system includes an emergency notification call band ratio information sending device that sends the emergency notification call band ratio information to a terminal which is connected to the radio network control apparatus by radio communication, and
wherein the terminal includes:
an emergency notification call band ratio information receiving device that receives the emergency notification call band ratio information from each of the different radio access network systems; and
a call connection processing device that issues an emergency notification call connected to the radio access network system which sent the emergency notification call band ratio information that indicates a minimum ratio.

2. The call control system in accordance with claim 1, wherein the different radio access network systems are two radio access network system which are a universal terrestrial radio access network abbreviated as UTRAN and an evolved universal terrestrial radio access network abbreviated as E-UTRAN.

3. The call control system in accordance with claim 2, wherein the communication exchange processing apparatus is:
a mobile service switching center abbreviated as MSC when the radio access network system is UTRAN; or
an enhanced power control abbreviated as EPC when the radio access network system is E-UTRAN.

4. The call control system in accordance with claim 2, wherein the radio network control apparatus is:
one of a NodeB and a radio network controller abbreviated as RNC when the radio access network system is UTRAN; or
an eNodeB when the radio access network system is E-UTRAN.

5. A call control method used in a call control system that performs call control for a terminal which accesses different radio access network systems, wherein:
an emergency notification call maximum bandwidth storage device of a communication exchange processing apparatus stores a maximum bandwidth for emergency notification calls processed in a radio access network system to which the processing apparatus belongs;
an emergency notification call bandwidth measuring device of the communication exchange processing apparatus measures a present bandwidth for emergency notification calls presently processed in the radio access network system to which the processing apparatus belongs;
a band ratio computation device of the communication exchange processing apparatus computes a ratio of the present bandwidth to the maximum bandwidth for emergency notification calls;
a band ratio notification device of the communication exchange processing apparatus sends emergency notification call band ratio information which indicates the ratio of the present bandwidth to the maximum bandwidth for emergency notification calls to a radio network control apparatus which is provided in the radio access network system and is connected to the processing apparatus;
an emergency notification call band ratio information sending device of the radio network control apparatus provided in the radio access network system sends the emergency notification call band ratio information to a terminal which is connected to the radio network control apparatus by radio communication;
an emergency notification call band ratio information receiving device of the terminal receives the emergency notification call band ratio information from each of the different radio access network systems; and
a call connection processing device of the terminal issues an emergency notification call connected to the radio access network system which sent the emergency notification call band ratio information that indicates a minimum ratio.

* * * * *